Aug. 21, 1951  H. VAN BUUREN  2,565,411
DEVICE FOR CRUSHING OLEIFEROUS SEEDS AND FRUIT
Filed May 31, 1949
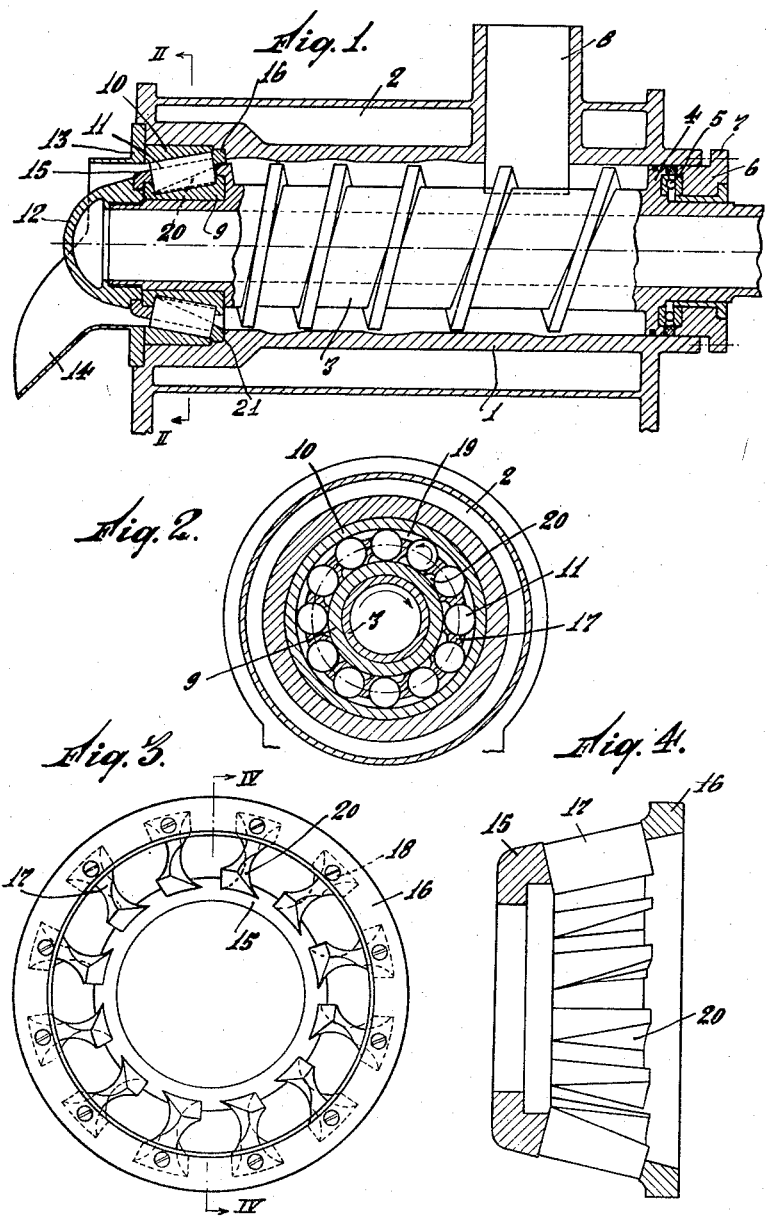
INVENTOR.
H. van Buuren
BY

UNITED STATES PATENT OFFICE 2,565,411

DEVICE FOR CRUSHING OLEIFEROUS SEEDS AND FRUIT

Hendrik van Buuren, Amsterdam, Netherlands

Application May 31, 1949, Serial No. 96,245
In the Netherlands June 4, 1948

3 Claims. (Cl. 241—106)

This invention relates to a device for crushing oleiferous seeds and fruit, which device comprises a number of rollers for crushing the material, said rollers being spaced apart by a cage and being arranged between two races, one of which is driven. Such constructions are also found in colloid mills.

According to the invention the inner periphery of the cage is so shaped that between each two adjacent rollers and at least on the side of the roller whose circumference moves towards the point of contact with the inner race, a passage extending longitudinally of said roller is formed, which passages at the one end communicate with an apparatus for feeding the material under pressure to the rollers and which are closed at the other end, the outer periphery of the cage being so shaped or having such a diameter respectively that between each two adjacent rollers there is left a passage extending longitudinally of said rollers, which passages are closed on the side of the apparatus for feeding the material and which on the other side directly communicate with a discharge opening.

The passages on the inner side of the cage are preferably so shaped that their walls converge towards the closed end.

A further feature of the invention is that the passages on the outer side of the cage are closed by a ring fitting into a groove in the inner wall of casing, which ring may be provided with a sealing means and which may either be secured to the cage or be formed in one therewith.

The drawing shows an embodiment of the invention.

Fig. 1 is a longitudinal section;

Fig. 2 is a cross section on the plane II—II in Fig. 1;

Fig. 3 is a view of the cage in axial direction and

Fig. 4 is a cross-section on the plane IV—IV in Fig. 3, of a device according to the invention which has been constructed for the purpose of crushing cacao-beans.

In a cylindrical casing 1 surrounded by a cooling jacket 2, a hollow conveyor worm 3 is arranged, which at the one end extending beyond the casing (not shown in the drawing) may be coupled to an actuating mechanism for driving the worm. At this end the worm is provided with a collar 4 fitting into the casing, which collar causes the worm to bear against a gland 6 via a ball-bearing 5, which gland comprises a flange 7 located outside the casing and secured thereto by means of tap-bolts.

The casing is provided with a filling tube 8 through which the material to be crushed can be fed into the space about the worm.

At the other end of the worm a number of rollers 11 is provided, which rollers are located between two races 9 and 10 having conical running surfaces. The inner race 9, which is provided with collars securing the rollers from axial displacement, is arranged on a portion of the worm that has been turned off to a reduced diameter and is clamped between the shoulder formed by the difference in diameters and a cover 12 screwed onto the end of the worm. The outer race 10 is mounted between a shoulder on the inner wall of the casing and a flange 13 secured against the end flange of the casing. A discharge spout 14 is integral with the flange 13.

The rollers 11 are spaced apart by a cage which is shown separately in Figures 3 and 4.

The cage consists of two annular elements 15 and 16, between which the rollers 11 are located, said elements being connected by studs 17 disposed between the rollers. The annular element 16 is formed by a separate ring which is secured to the end faces of the studs 17 by means of screws 18.

The ring 16 fits into a groove in the casing, which groove is formed by a turned-off portion of the wall of the casing and the race 10. The annular element 15 fits into a groove formed between the inner race 9 and a shoulder on the cover 12.

The outer circumference of the studs 17 being smaller than the inner circumference of the outer race 10, passages 19 are formed between said circumferences and between the rollers 11, which passages are obturated by the ring 16 on the side facing the worm, but which on the other side directly communicate with the discharge opening formed by the spout 14.

The inner circumference of the studs 17 fits against the running surface of the inner race 9, but each stud is provided with a recession 20 located on the side of the roller, the circumference of which will move towards the point of contact with the inner race when the worm is rotated.

The cross sectional area of said recessions 20 is largest on the side facing the worm and gradually diminishes then so that on the other side of the studs this cross-sectional area has dwindled away to nothing. At the end adjacent the ring 16, the passages formed by these recessions directly communicate therefore, with the space in which the worm rotates whereas at the other end they are closed.

The ring is inserted in the groove 21 by means of which a sealing is produced.

When material is fed through the filling tube 8 into the space surrounding the worm and said worm is rotated, this material is driven towards the rollers 11 where it is forced into the passages formed by the recessions 20.

Each passage is formed by the wall of a recession 20 the circumference of the inner race 9 and a roller 11. Seeing that the passage is closed at the other end, the material can only find a way out between the inner race 9 and the roller 11, which roller moves in the direction of the arrow (Fig. 2), so in the direction towards the point of contact with the inner race.

There is some space between the roller and the inner race through which the material can pass but in which it is crushed at the same time. This space may be adjusted by displacing the worm 3 in axial direction by means of the gland 6. The crushed material is carried along on the surface of the roller and passes through the space between the roller and the stud 17 on the other side of the roller and thus enters the passage on said side of the roller, which passage is formed between said stud and the outer race 10.

This passage being open only on the side of the discharge spout 14, the material is forced out of the passage towards said spout where it is collected.

It stands to reason that various parts of the device may be constructed in another manner. The apparatus for feeding the material under pressure to the rollers may be replaced by any other apparatus suited for that purpose. Also the dimensions given to the device will be entirely dependent on the quantity and the nature of the material to be treated.

The invention resides in the arrangement of the rollers 11 which effect the crushing operation. The only part that is positively driven is the inner race 9, the rollers being rotated by this inner race but having a smaller circumferential speed than said race. The outer race may also be slightly rotatable, while naturally the movement of the cage is dependent on the movement of the rollers. It is not strictly necessary for the races to be conical.

I claim:

1. A device for crushing oleiferous seeds and fruit, comprising a plurality of rollers arranged between two races one of which is driven, a cage spacing apart said rollers, the inner periphery of the cage being so shaped that between each two adjacent rollers and at least on the side of the roller whose circumference moves towards the point of contact with the inner race, a passage extending longitudinally of said roller is formed, said passage at one end communicating with an apparatus for feeding the material under pressure to the rollers and being closed at the other end, the outer periphery of the cage being so shaped and dimensioned that between each two adjacent rollers a passage is formed extending longitudinally of said rollers, said passages being closed on the side of the apparatus for feeding the material and on the other side directly communicating with a discharge opening.

2. A device according to claim 1, and wherein the passages on the inner side of the cage are so shaped that their walls converge towards the closed end.

3. A device according to claim 2, and wherein said passages on the outer side of the cage are closed by a ring fitting into a groove in the inner wall of said casing and forming therein sealing means.

HENDRIK van BUUREN.

REFERENCES CITED

The following references are of record in the file of this patent:

UNITED STATES PATENTS

| Number | Name | Date |
| --- | --- | --- |
| 1,745,478 | Duncan | Feb. 4, 1930 |
| 1,897,157 | Wells | Feb. 14, 1933 |
| 1,960,708 | Loomis | May 29, 1934 |
| 1,963,970 | Cannard | June 26, 1934 |
| 2,204,140 | Langbein | June 11, 1940 |